(12) United States Patent
Neve et al.

(10) Patent No.: US 6,454,179 B1
(45) Date of Patent: Sep. 24, 2002

(54) METHOD FOR CONTROLLING A HEATING SYSTEM AND HEATING SYSTEM

(75) Inventors: Christian Neve, Lausen (CH); Jørgen Seerup, Mårslet (DK); Eva Kühne, Silkeborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/988,075

(22) Filed: Nov. 16, 2001

(30) Foreign Application Priority Data

Nov. 18, 2000 (DE) ........................................ 100 57 361

(51) Int. Cl.$^7$ ............................................ G05D 23/00
(52) U.S. Cl. ..................... 237/2 A; 236/91 F
(58) Field of Search ................ 237/2 A, 8 A, 237/8 C; 236/91 F

(56) References Cited

U.S. PATENT DOCUMENTS

| | | | |
|---|---|---|---|
| 4,071,745 A | * 1/1978 | Hall ........................... | 165/11.1 |
| 4,192,455 A | 3/1980 | Rasmussen et al. | |
| 4,217,646 A | * 8/1980 | Caltagirone et al. ........ | 165/205 |
| 4,997,029 A | * 3/1991 | Otsuka et al. .............. | 165/11.1 |
| 5,178,324 A | * 1/1993 | Moesby ....................... | 137/455 |
| 5,195,886 A | * 3/1993 | Ida ........................... | 126/110 C |
| 5,350,114 A | * 9/1994 | Nelson et al. .......... | 123/142.5 R |
| 5,493,272 A | * 2/1996 | Beghelli ...................... | 340/505 |
| 5,588,591 A | * 12/1996 | Sweitzer, Jr. ............... | 165/297 |
| 5,692,676 A | * 12/1997 | Walker ...................... | 236/91 F |
| 5,839,655 A | * 11/1998 | Iritani ......................... | 237/8 A |

FOREIGN PATENT DOCUMENTS

| | | |
|---|---|---|
| DE | 27 14 511 B1 | 2/1978 |
| DE | 31 23 649 A1 | 11/1982 |

* cited by examiner

Primary Examiner—Harold Joyce
Assistant Examiner—Derek S. Boles
(74) Attorney, Agent, or Firm—Burns, Doane, Swecker & Mathis, L.L.P.

(57) ABSTRACT

A heating system has several heating devices with valves, controlled in dependence of the temperature, in different rooms, with the heating devices being supplied by a supply device with an adjusting member which acts upon a supply temperature. A control device activates the adjusting member. A heat requirement in the rooms is detected and the supply temperature is adapted accordingly. To keep the energy consumption low, a counter detects the number of rooms in which a heat requirement exists. The supply temperature is increased by a value which corresponds to a product of the number of rooms and a predetermined first temperature difference when the number of rooms is higher than zero. When the number of rooms is equal to zero, the supply temperature is decreased by a predetermined second temperature difference.

14 Claims, 2 Drawing Sheets

METHOD FOR CONTROLLING A HEATING SYSTEM AND HEATING SYSTEM

FIELD OF THE INVENTION

Figure 1:
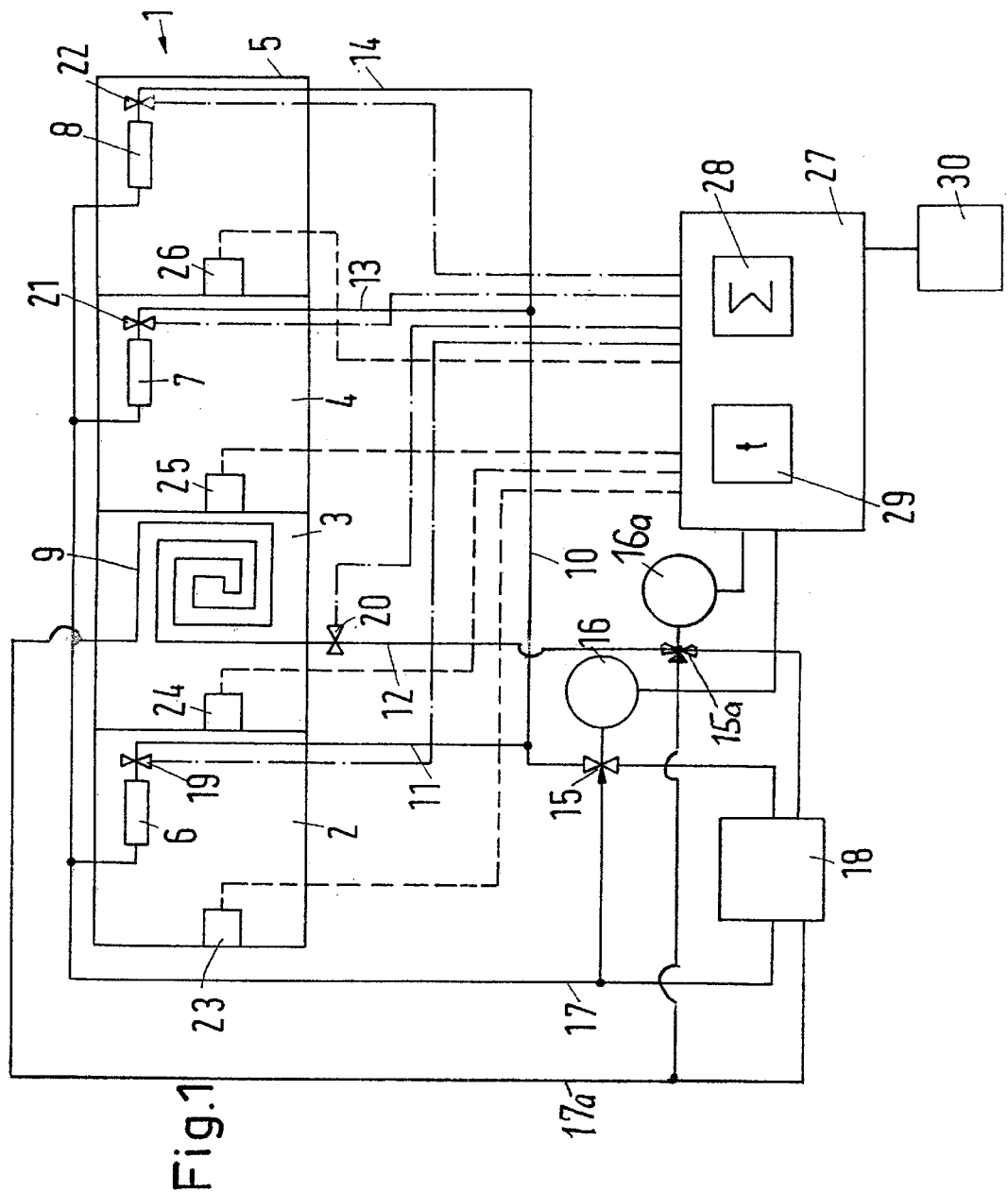

The invention concerns a method for controlling a heating system with heating devices in several rooms, the devices being acted upon by a heating fluid with a supply temperature, the heat requirement of the rooms being detected and the supply temperature being adapted to the heat requirement. Further, the invention concerns a heating system with several heating devices; supplied with valves controlled in dependence of the temperature, in various rooms, a supply device with an adjusting member for influencing a supply temperature and a control device, which activates the adjusting member.

BACKGROUND OF THE INVENTION

A method and a heating system of this kind are known from DE 31 23 649 A1. Here, the opening degree of the thermostatic valves is detected, meaning that it can be sufficient to detect whether the thermostatic valves are opened or closed. When it is established that a thermostatic valve is open, the conclusion is that a heat requirement exists. When a heat requirement exists, the supply temperature is increased. When no heat requirement exists, the supply temperature is decreased.

SUMMARY OF THE INVENTION

A similar method is known from DE 27 14 511 C2. Here, the supply temperature is adapted to the highest heat requirement. For this purpose, an adjusting member is provided, which acts upon a mixing valve.

The invention is based on the task of keeping the energy consumption low.

With a method as mentioned in the introduction, this task is solved in that the number of rooms is ascertained, in which a heat requirement exists, and the supply temperature is increased by a value, which corresponds to a product of the number and a predetermined first temperature difference, when the number is higher than zero, and is reduced by a predetermined second temperature difference, when the number is equal to zero.

With this method, the supply temperature is kept very close to the actual requirement. Accordingly, losses, particularly transmission losses, which may result from a too high supply temperature, are relatively small. The heat requirement is continuously detected in all rooms. When there is no heat requirement in any if the rooms, it may be assumed that the supply temperature can be reduced. When a heat requirement exists in one room, it is assumed that this heat requirement can be satisfied faster, when the supply temperature is increased. In this case, the supply temperature is therefore increased. Additionally, the number of rooms is taken into consideration, in which the corresponding heat requirement exists. When, for example after a night-setback, the temperature must increase in several rooms at the same time, meaning that a heat requirement exists in several rooms, the supply temperature is increased more than in the case, when a heat requirement only exists in one room. Thus, the supplied energy can be even better adapted to the actual heat requirement.

Preferably, the supply temperature is kept constant for a predetermined period after a change. Thus, it is avoided that the supply temperature increases or reduces too fast because of a sudden and brief load change. Such a change of the load may, for example, occur, when a room is ventilated or exposed to a sudden, intensive sun irradiation. Only when a lasting change appears, the supply temperature is changed.

Preferably, the heat requirement of a room is detected from a position of, or a signal influencing a position of, a valve controlled in dependence of the temperature, said valve being allocated to the room in question. In connection with the valve, it will be sufficient to establish whether the valve is open or not. The size of the opening does not necessarily have to be considered. When the valve is open, a heat requirement exists. When the valve is closed, a heat requirement does not exist. In many cases, it is therefore not even necessary to detect the actual position of the valve. Particularly, when the valves can be remotely controlled, it is sufficient to check, if the valve has been opened or closed by the remote control. It is then not necessary to collect the information direct from the valve, the information, which is available otherwise, can be evaluated directly. On the other hand, the knowledge of the opening degree of the valve involves advantages, as it offers additional or better information about the actual heat requirement. The heat requirement can, for example, be detected by means of an LVDT transducer. In connection with floor heating systems, which are frequently controlled by means of on/off valves, the best result is obtained, when the time is considered, during which the valve in question is open. Thus, also information about the actual heat requirement is obtained. The same applies for pulsating or 0 to 10V activating elements. This means that the duty cycle, that is, the relation between the on- or opening time and the period length (sum of on- and off-times) can be detected. The optimum duty cycle can then be called reference time. This will depend on the application, with floor heating systems, for example, it will be in the range from 60 to 80%. When the opening time is lower than the reference time, that is, for example, the opening time is smaller than 80% of the period length, the supply temperature is reduced. When it is higher, the supply temperature is increased.

Preferably, the size of at least one of the temperature differences is chosen in dependence of the outdoor temperature. When, for example, it is very cold outside, it may be expedient to let the temperature increase by a higher value, when a heat requirement occurs, than would be the case in connection with a higher outdoor temperature. On the other hand, it can be expedient, in connection with a high outdoor temperature, to reduce the supply temperature in larger steps, than would be the case in connection with a lower outdoor temperature.

Preferably, the transmission of information about the heat requirement to the control device is wireless. This embodiment is particularly advantageous in connection with floor heating systems or combined heating systems, made up of floor heating and radiators, as here temperature sensors or thermostatic valves can be used, which are in radio contact with the control device. Particularly in connection with an upgrading the forcing open of walls and the running of cables can be avoided.

In a heating system as mentioned in the introduction, the task is also solved in that the control device has a counter, which counts the number of rooms, in which a heat requirement exists.

By means of the counter, it cannot only be established, if a heat requirement exists, which involves the necessity of increasing the supply temperature, it can also be quantitatively determined, how large the heat requirements Thus, the supply temperature can, in a simple manner, be increased in dependence of the number of rooms, in which a heat requirement exists.

Preferably, the control device has a time-relay, which prevents changes of the supply temperature for a predetermined period. This ensures that the supply temperature can be kept constant for a certain period after the changes, so that the changes of the supply temperature can become effective. Then the control device can detect again, if, and in how many rooms, a heat requirement exists, increasing or decreasing the supply temperature accordingly.

Preferably, the control device is in wireless connection with the valves. Thus, it is firstly ensured that the information required to adjust the valves is already available at the control device. This means that the counter can adopt values, which are already available in the control device.

A BRIEF DESCRIPTION OF THE DRAWING FIGURES

In the following, the invention is described on the basis of a preferred embodiment in connection with the drawings, showing:

FIG. 1 a schematic view of a heating system

Figure 2:
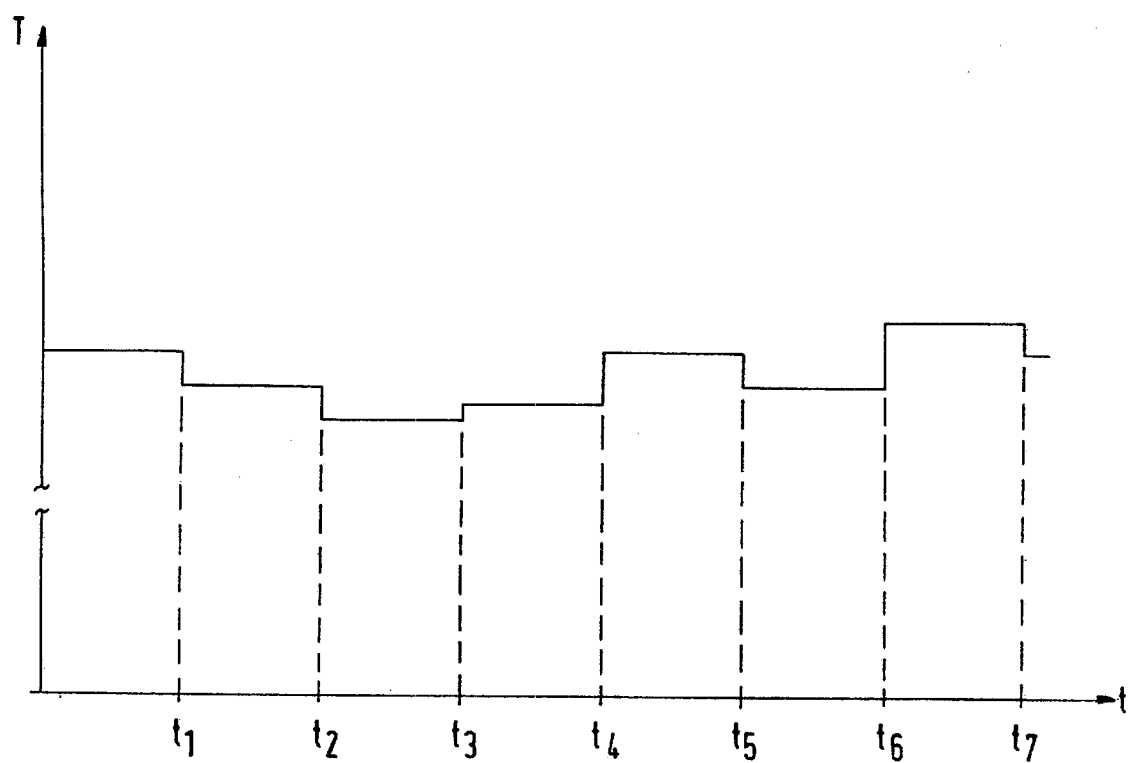

FIG. 2 a temperature course of the supply temperature

FIG. 1 shows a heating system 1 for heating several rooms 2, 3, 4, 5. Each room is provided with a heating device, the rooms 2, 4 and 5 being provided with radiators 6, 7, 8 and room 3 having a floor heating 9.

A DETAILED DESCRIPTION OF THE INVENTION

Through each of the heating devices 6 to 8, a heating fluid, namely hot water, is flowing, the fluid being distributed to the individual heating devices 6 to 8 by a supply line 10, from which individual feeder lines 11, 13, 14 branch off. At the inlet of the supply line 10, there is a mixing valve 15, which can be adjusted by means of an adjusting drive 16, for example an electric motor. By means of the mixing valve 15, colder water from a return line 17, which transports heating water from the heating devices 6 to 8, is added. Thus, it is possible to reduce the supply temperature to a temperature, which is lower than the one coming from a boiler 18 (or another heat source). For the floor heating 9 a second heating circuit with corresponding elements is provided, whose reference numbers are provided with an "a", that is, a return line 17a, a mixing valve 15a, and an adjusting drive 16a. This means that a different supply temperature can be set for the floor heating.

The amount of heating fluid, which is actually supplied to the heating devices 6 to 9, is determined by the valves 19, 20, 21, 22. These valves are controlled by a common control device 27. For this purpose, dotted line paths are shown as connections between the control device 27 and the valves 19 to 22. On the one hand, these line paths can be virtually existing signal lines, for example in the form of electric cables or glass fibre cables. However, they can also be wireless, when the corresponding information between the control device 27 and the valves 19 to 22 are transmitted by electromagnetic waves, for example radio waves.

The control device 27 receives the information about the temperature in each room from temperature sensors 23, 24, 25, 26, which are arranged in each room 2 to 5. The corresponding line paths are shown with dotted lines. Also here, the line paths can be virtual cables. However, they can also be wireless, functioning by means of, for example, radio waves.

Particularly in connection with the radiators 6 to 8, the valves 19, 21, 22 and the temperature sensors 23, 25, 26 can be made as one component, so that they form traditional thermostatic radiator valves. Also in this case, however, there is a connection between the thermostatic radiator valves and the control device 27.

The control device 27 activates the individual valves 19 to 22 in such a way, that a desired temperature, which is preset for each room 2 to 5, is achieved in the best possible way. When the temperature is too low, the corresponding valves 19 to 22 open. When the temperature is exceeded, the valves 19 to 22 are closed.

The control device 27 also controls the mixing valve 15 by activating the adjustment device 16. In this connection, the following procedure is used:

The control device 27 establishes, in which of the rooms 2 to 5 a heat requirement exists. A heat requirement is always assumed to exist, when one of the valves 19 to 22 is open. In this connection, the control device can in fact determine, if a valve 19 to 22 is open. However, also the signals activating the valves 19 to 22 can be used as criterion for determining, whether the corresponding valve 19 to 22 should be open or not. The control device 27 has a counter 28, which detects the number of open valves 19 to 22. Further; the control device 27 has a time-relay 29, which only permits this detection and the adjustment procedure described below at predetermined intervals, for example 5 minutes.

When the counter 28 establishes that none of the rooms 2 to 5 has a heating requirement, for example because none of the valves 19 to 22 is open, the supply temperature in the supply line 10 is reduced by a predetermined temperature difference, for example 1° C. This is the case at the times t1, t2.

A the time t3, the counter 28 establishes that a heat requirement exists in one of the four rooms, sa one of the values 19 to 22 has opened. In this case, the control device 27 increases the temperature by another, smaller temperature difference,for example 0.5° C. At a time t4, the control device establishes that a heat requirement exists in 3 rooms in total. Accordingly, the control device 27 increases the supply temperature by three times the temperature difference, that is, 3×0.5=1.5° C., and again, after 5 minutes, the effect is established. At a time t5 it is established that all valves are closed, that is, a heat requirement does not exist. Accordingly, the supply temperature is decreased by 1° C. again. At a time t6 there is a heat requirement in all four rooms 2 to 5. Accordingly, the supply temperature is increased by 4×0.5° C.=2° C. At the time t7, all valves 19 to 22 are closed, and the supply temperature is accordingly reduced by 1° C. Between all times t1 to t7 there are intervals of 5 minutes.

The fact that the changes of the supply temperature depend on the number of rooms with a heat requirement, also involves that a possible larger load is considered, for example in connection with a zone programming, in which several rooms switch from night to day operation at the same time. When the supply temperature is kept constant for a predetermined period, it is avoided that the flow increases too fast in connection with a sudden and brief load change, for example when one or more rooms are ventilated.

Additionally, an outdoor temperature sensor 30 can be connected with the control device 27. The outdoor temperature sensor 30 can be used to change the size of the temperature differences for the increase or decrease of the supply temperature. When the outdoor temperature is low, it may be expedient to increase the supply temperature by a temperature difference, which is larger than the 0.5° C. mentioned above. When, on the other hand, the outdoor temperature is very high, it may be expedient to reduce the supply temperature by more than the 1° C. mentioned above.

What is claim:

1. Method for controlling a heating system with heating devices in several rooms, the heating devices being acted upon by a heating fluid with a supply temperature, a heat requirement of the rooms being detected and the supply temperature being controlled according to the heat requirement, the method comprising: ascertaining the number of rooms in which a heat requirement exists; increasing the supply temperature by a value which corresponds to a product of the number of rooms and a predetermined first temperature difference when the number of rooms is higher than zero; and reducing the supply temperature by a predetermined second temperature difference when the number of rooms is equal to zero.

2. Method according to claim 1, including maintaining the supply temperature constant for a predetermined period after a change in the supply temperature.

3. Method according to claim 1, wherein the heat requirement of each room is detected based on a position of a valve associated with the room and controlled in dependence on the temperature in the room.

4. Method according to claim 1, wherein a magnitude of at least one of the first and second predetermined temperature differences is based on an outdoor temperature.

5. Method according to claim 1, wherein information about the heat requirement of each room is transmitted to a control device in a wireless manner.

6. Heating system comprising several heating devices in a number of rooms, each heating device being operatively associated with a valve controlled in dependence on a temperature in the room, a supply device which supplies heating fluid to the heating devices, the supply device including an adjusting member for influencing a supply temperature of the heating fluid, and a control device which activates the adjusting member, the control device having a counter which counts the number of rooms in which a heat requirement exists.

7. The heating system according to claim 6, wherein the control device has a time-relay which prevents changes of the supply temperature for a predetermined period.

8. The heating system according to claim 6, wherein the control device is connected to the valves in a wireless manner.

9. Method according to claim 1, wherein the heat requirement of each room is detected based on a signal influencing a position of a valve associated with the room and controlled in dependence on the temperature in the room.

10. Method for controlling a heating system having heating devices in several rooms which are acted upon by a heating fluid possessing a supply temperature, comprising:
    determining a heat requirement for each room to ascertain the number of rooms in which a heat requirement exists; and
    controlling the supply temperature according to the heat requirement by increasing the supply temperature by a value corresponding to a product of the number of rooms and a predetermined first temperature difference when the number of rooms is greater than zero and decreasing the supply temperature by a predetermined second temperature difference different from the predetermined first temperature difference when the number of rooms is equal to zero.

11. Method according to claim 10, including maintaining the supply temperature constant for a predetermined period of time after the supply temperature has been changed.

12. Method according to claim 10, wherein a magnitude of at least one of the first and second predetermined temperature differences is based on an outdoor temperature.

13. Method according to claim 10, including transmitting information about the heat requirement of each room to a control device in a wireless manner.

14. Method according to claim 10, wherein the first predetermined temperature difference is less than the second predetermined temperature difference.

* * * * *